(12) United States Patent
Agrawal

(10) Patent No.: US 8,250,394 B2
(45) Date of Patent: Aug. 21, 2012

(54) VARYING THE NUMBER OF GENERATED CLOCK SIGNALS AND SELECTING A CLOCK SIGNAL IN RESPONSE TO A CHANGE IN MEMORY FILL LEVEL

(75) Inventor: Parag Vijay Agrawal, Moradabad (IN)

(73) Assignee: STMicroelectronics International N.V., Amsterdam (NL)

( * ) Notice: Subject to any disclaimer, the term of this patent is extended or adjusted under 35 U.S.C. 154(b) by 1264 days.

(21) Appl. No.: 11/732,495

(22) Filed: Apr. 2, 2007

(65) Prior Publication Data

US 2008/0028249 A1 Jan. 31, 2008

(30) Foreign Application Priority Data

Mar. 31, 2006 (IN) .............................. 931/DEL/2006

(51) Int. Cl.
*G06F 1/00* (2006.01)
*G06F 13/00* (2006.01)
(52) U.S. Cl. ........ 713/322; 713/320; 713/600; 711/154; 711/156
(58) Field of Classification Search .................. 713/320, 713/322, 600; 711/154, 156
See application file for complete search history.

(56) References Cited

U.S. PATENT DOCUMENTS

| | | | | |
|---|---|---|---|---|
| 5,684,418 A * | 11/1997 | Yanagiuchi | ..................... | 327/99 |
| 6,219,396 B1 * | 4/2001 | Owada | ......................... | 375/372 |
| 6,359,948 B1 * | 3/2002 | Turudic et al. | ................. | 375/376 |
| 6,522,210 B1 * | 2/2003 | Dvorak et al. | ................... | 331/78 |
| 6,564,329 B1 | 5/2003 | Cheung et al. | | |
| 6,587,956 B1 * | 7/2003 | Hiratsuka et al. | ............. | 713/500 |
| 6,647,502 B1 * | 11/2003 | Ohmori | ......................... | 713/322 |
| 6,865,653 B2 * | 3/2005 | Zaccarin et al. | .............. | 711/154 |
| 7,114,086 B2 * | 9/2006 | Mizuyabu et al. | ............. | 713/320 |
| 7,478,260 B2 * | 1/2009 | Spencer | ......................... | 713/600 |
| 2001/0014924 A1 * | 8/2001 | Nishihara | ....................... | 710/52 |
| 2002/0099964 A1 * | 7/2002 | Zdravkovic | ................... | 713/320 |
| 2003/0028816 A1 * | 2/2003 | Bacon | ........................... | 713/500 |
| 2003/0115428 A1 * | 6/2003 | Zaccarin et al. | .............. | 711/156 |
| 2003/0219032 A1 * | 11/2003 | Tweed et al. | .................. | 370/468 |
| 2005/0135505 A1 * | 6/2005 | Ebuchi et al. | ................. | 375/308 |
| 2005/0265462 A1 * | 12/2005 | Bueti et al. | ..................... | 375/257 |
| 2005/0283634 A1 * | 12/2005 | Rai | ................................. | 713/600 |
| 2006/0080566 A1 * | 4/2006 | Sherburne | ...................... | 713/500 |
| 2006/0174151 A1 * | 8/2006 | Lin et al. | ........................ | 713/500 |
| 2007/0069778 A1 * | 3/2007 | Choi et al. | ..................... | 327/158 |
| 2007/0159970 A1 * | 7/2007 | Chilukoor | ..................... | 370/230 |
| 2007/0208962 A1 * | 9/2007 | Zdravkovic | ................... | 713/320 |
| 2007/0284609 A1 * | 12/2007 | Ang et al. | ..................... | 257/139 |
| 2008/0141063 A1 * | 6/2008 | Ridgeway et al. | ............. | 713/501 |

* cited by examiner

*Primary Examiner* — Vincent Tran
(74) *Attorney, Agent, or Firm* — Graybeal Jackson LLP

(57) ABSTRACT

A system and method provide adaptive frequency scaling for predicting the load on a processing unit and dynamically changing its clock frequency while keeping the synchronization with other processing units. The amount of data in an input memory waiting to be processed is a good indicator of the current load and thus embodiments utilize the same concept for predicting the load on the processing unit. The frequency of operation is thus changed on the basis of the percentage of memory being occupied by its input data. Algorithms according to embodiments allow the processing unit to use the maximum possible clock frequency only when it is required and to run at some lower frequencies in low processing power requirements. Operating the circuit at low frequency helps in reducing power consumption.

34 Claims, 6 Drawing Sheets

VARYING THE NUMBER OF GENERATED CLOCK SIGNALS AND SELECTING A CLOCK SIGNAL IN RESPONSE TO A CHANGE IN MEMORY FILL LEVEL

PRIORITY CLAIM

The present application claims the benefit of Indian Patent Application No. 931/Del/2006, filed Mar. 31, 2006, which application is incorporated herein by reference in its entirety.

TECHNICAL FIELD

The embodiments relate to dynamic frequency scaling in electronic devices and more particularly to adaptive frequency scaling based on workload prediction for reducing power consumption in an electronic device.

BACKGROUND

Current trends in the chip industry point to the development of heterogeneous systems that will be able to support several complementary standards on a single chip in order to satisfy the user's demands in diverse application scenarios. These systems will lead to the integration of existing technologies and standards and will be based on reconfigurable architecture consisting of hardware units shared between different technologies and standards.

Supporting different types of task or service requests in a heterogeneous system based on reconfigurable architectures and side-by-side satisfying the need for low power consumption is a challenge.

An interactive mobile terminal, for example can spend 90% of system energy and time waiting for a user response. Such idle periods provide opportunities for dynamic power management and voltage scaling techniques to reduce the system power usage. Dynamic voltage frequency scaling (DVFS) is a technique to reduce active power consumption by scaling processor frequency and voltage to meet the required performance. This technique enables a chip to operate at different voltages and clock frequencies. In a system based on dynamic frequency clocking, the current operating frequency of a processing unit is set on the basis of different factors. These factors may be application, environment, or circuit specific. The conventional systems based on dynamic frequency clocking try to reduce the power consumption by changing the frequency on the basis of technology or standard or interface being used at that time.

The most effective way to reduce dynamic power consumption on an implementation level is scaling of the supply voltage due to the quadratic dependence. The limiting parameter is the propagation delay through a digital circuit that increases with low supply voltages.

The propagation delay through a CMOS circuit increases drastically as the supply voltage approaches the threshold voltage of the circuit. On the other hand, there is only little impact on performance with high supply voltages. Therefore, any voltage reduction must be balanced against performance reduction. To compensate and maintain the same data throughput extra hardware may be added.

The working principle of dynamic frequency clocking has been explained with the help of a block diagram shown in FIG. 1. A Clock Divider Block (also known as Frequency Divider Block) (101) is used to generate multiple clock frequencies based on a master clock frequency which is the maximum frequency at which the synthesized system can work. The multiple clocks have been shown as 102A, 102B, 102C and 102D. A frequency selector (103) selects one of these frequencies based on some control signals generated by a control block (104). The delay that is needed by the dynamic frequency scaling circuit to change the clock frequency and remaining stabilized is taken into account at the time of implementation.

One system and method for dynamic clock generation includes a clock controller for an Application Specific Integrated Circuit (ASIC) for a portable electronic device that dynamically and automatically varies the frequency of on-chip clocks in response to bandwidth requirements of the driven logic. The ASIC includes one or more oscillators used by phase locked loops (PLLs) to generate one or more master clocks. These master clocks are received by a system clock controller which derives various clocks of different frequencies from the master clocks. These derived clocks are used to drive the various controllers and peripherals connected to the ASIC. For example, the system clock controller preferably generates a memory clock for clocking the memory controller and the external memory devices, a bus clock for clocking the system bus, a CPU clock for clocking the CPU, and one or more peripheral clocks for clocking the various peripheral controllers and peripherals coupled to the ASIC. The various devices in the ASIC that can be accessed by other devices in the ASIC are known as "resources". The speed at which a resource is clocked affects the rate at which the resource can process data (i.e. the bandwidth of the resource). Every device in the ASIC that can access a resource, also known as a controller, has a request line coupled to the system clock controller to indicate when the controller is accessing a resource. In addition, the system clock controller has a programmable bandwidth register associated with each controller for holding a value representing the bandwidth utilized by the controller. The system clock controller also preferably includes an adder, a frequency table, and a multiplexer (MUX) for each clocked resource. When a controller accesses a resource, the controller signals the system clock controller via the request line. The system clock controller in turn, uses the adder to sum the values held in the bandwidth registers of all of the controllers that are currently accessing the resource. The resulting sum is then used as an index to an entry in the frequency table. The contents of the entry are applied to the selection lines of the MUX and dynamically select the appropriate clock frequency for the resource. Thus, the clock frequency for the resource is automatically determined by the total bandwidth utilization of the controllers requesting access to the resource. Accordingly, the clock frequency is preferably chosen so that the bandwidth of the resource closely matches the needed bandwidth. As a result, little power is wasted due to operating the resource at a higher clock frequency than is necessary.

The above mentioned technique and other such techniques based on conventional dynamic frequency clocking reduce power consumption in an ASIC by changing the frequency of operation on the basis of the interface or standard being used at that time. These conventional techniques cannot work in the scenarios when there is only one technology or standard or interface controller is being used. In case of single standard, the processing requirement may change depending on the real time incoming data scenarios. For example, the real time data scenario may vary from time to time in terms of the number of packets arriving in a burst, size of each packet, inter-packet delay. Data sometimes can come as a burst of large number of packets whereas other times, the burst can just comprise only two or three packets. These variations have not been taken into account by any of the existing techniques of frequency scaling.

Therefore, there arises a need for a system and method for dynamic frequency scaling which dynamically modifies the frequency of operation not on the basis of interface and standard being used but on the basis of load on the processing unit at a particular time, which is the right criterion for the processing requirement.

SUMMARY

Embodiments provide an improved technique of dynamic frequency scaling which modifies the frequency of operation not on the basis of an interface and standard being used but on the basis of the load on the processing unit at a particular instant of time.

An improved algorithm predicts the load on the processing unit and dynamically changes its clock frequency while keeping the synchronization with other processing units. The amount of data in the input memory waiting to be processed is a good indicator of the current load. Embodiments utilize the same concept for predicting the load on the processing unit. The frequency of operation is thus changed on the basis of the percentage of memory being occupied by its input data. Algorithms according to embodiments allow the processing unit to use the maximum possible clock frequency only when it is required and run at some lower frequencies in low processing power requirements. Operating the circuit at low frequency helps in reducing power consumption. Embodiments also provide a method of implementing the proposed algorithm in the form of a simple digital circuit.

To overcome the drawbacks of the prior art and to achieve the aforementioned objectives, according to one embodiment, a system for adaptive frequency scaling in an electronic device includes an input interface block for receiving real time data, at least one processing unit for processing real time data received by the input interface block, at least one memory unit for storing the real time data before the data is processed by the processing unit, a frequency divider block for generating multiple clock frequencies from received clock frequency; and a control unit for selecting the appropriate frequency of operation from the multiple clock frequencies wherein the selection is based on the level of utilization of the memory unit.

According to one embodiment, a method for adaptive frequency scaling in an electronic device includes initializing the processing unit of said electronic device at a first frequency, keeping track of data present in memory for processing, signaling the change in occupancy level of memory; and changing the frequency of operation of said processing unit in response to change in occupancy level of memory

BRIEF DESCRIPTION OF THE DRAWINGS

Embodiments will now be described with reference to the accompanying drawings.

DETAILED DESCRIPTION

The following discussion is presented to enable a person skilled in the art to make and use the described embodiments. Various modifications to the embodiments will be readily apparent to those skilled in the art, and the generic principles herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Figure 1:
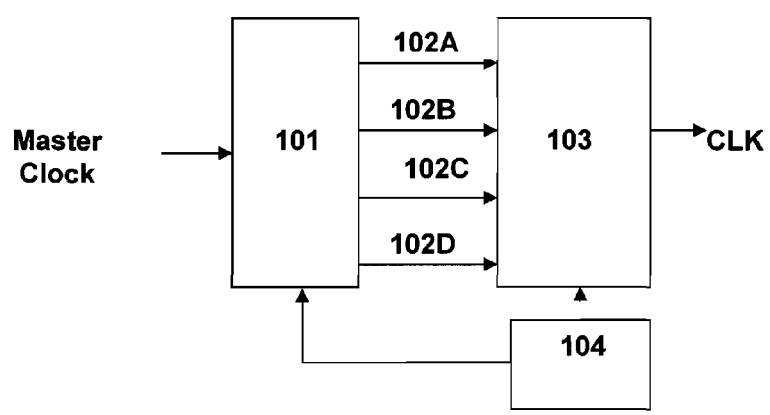
FIG. 1 shows the basic principle of dynamic frequency clocking in the form of a block diagram.
Figure 2:
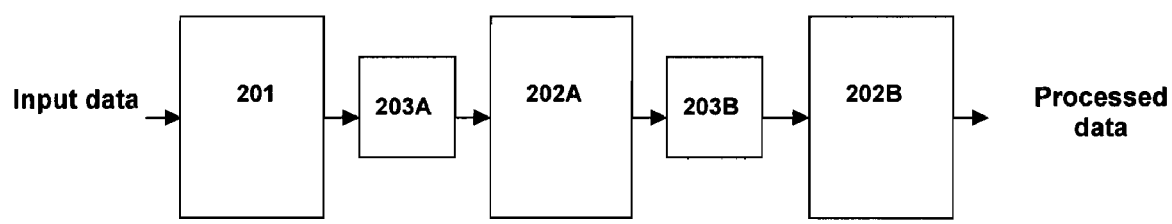
FIG. 2 shows a block diagram of the basic structure of a standard chip.

FIG. 2 shows a block diagram of a standard chip. An Input Interface Block (201) receives real-time data which needs to be processed inside the chip by some Processing Units. The Input Interface Block (201) may either support different standards or a single standard depending on the implementation. The frequency of the Input Interface block is fixed depending on the standard it is supporting e.g. XGMII, GMII etc., while on the other hand, the Processing Units (202A and 202B) use dynamic frequency scaling scheme. The data is passed from one clock domain to another clock domain through FIFOs (203A and 203B). The data values are written to a FIFO buffer from one clock domain and the data values are read from the same FIFO buffer from another clock domain, where the two clock domains can be asynchronous to each other.

Figure 3:
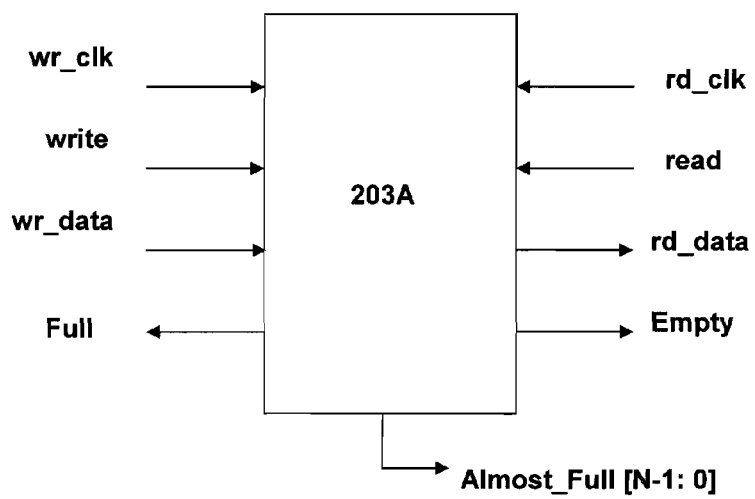
FIG. 3 shows a block diagram of an asynchronous FIFO according to an embodiment.

FIG. 3 shows a block diagram of an asynchronous FIFO used in embodiments. Two independent interfaces to the queue with all the signals needed for the implementation of the algorithm of embodiments are also shown. Signals wr_clk & rd_clk denote the clocks used to write to and read from the FIFO buffer respectively. Full & Empty are the signals used to check whether the FIFO is full or empty respectively. The FIFO implementation uses separate pointers for write & read, WR_PTR & RD_PTR whose width depends on the depth of RAM used to implement the asynchronous FIFO. Before incrementing the FIFO pointers, "if not Full" or "if not Empty" tests are performed to ensure that overflow or underflow would not happen anytime. These tests are implemented by comparing the status of WR_PTR and RD_PTR.

Apart from the above mentioned signals, a multi-bit signal named "almost_full" (herein after referred to as "status signal") of width N is used to signal the different percentage occupancy levels of the FIFO buffer. The width of the signal, N, depends on the implementation & different parameters like the maximum or average length of the packets that can come on the input interface and the depth of the buffer used to implement the FIFO. For example, if the average packet length of the incoming packet is 512 bytes, maximum packet length is 1024 bytes and the FIFO RAM depth is 8 Kbytes, then the width N can be taken as 3 such that "almost_full[2]= 1" implies that the buffer is at least 75% filled i.e. buffer has at least 12 average size packets, "almost_full[1]=1" implies that the buffer is at least 50% filled but less than 75% i.e. buffer has between 8-12 average size packets, and "almost_ full[0]=1" implies that the buffer is at least 25% filled but less than 50% i.e. buffer has between 4-8 average size packets. So in this case we have, almost_full[2]=1, if buffer occupancy is between 75% and 100%;

almost_full[1]=1, if buffer occupancy is between 50% and 75%; and almost_full[0]=1, if buffer occupancy is between 25% and 50%.

Where, "between a % and b %" means greater than or equal to a % but less than b %. Where a and b can take any value like 25, 50, 75, 100 as mentioned above.

Figure 4:
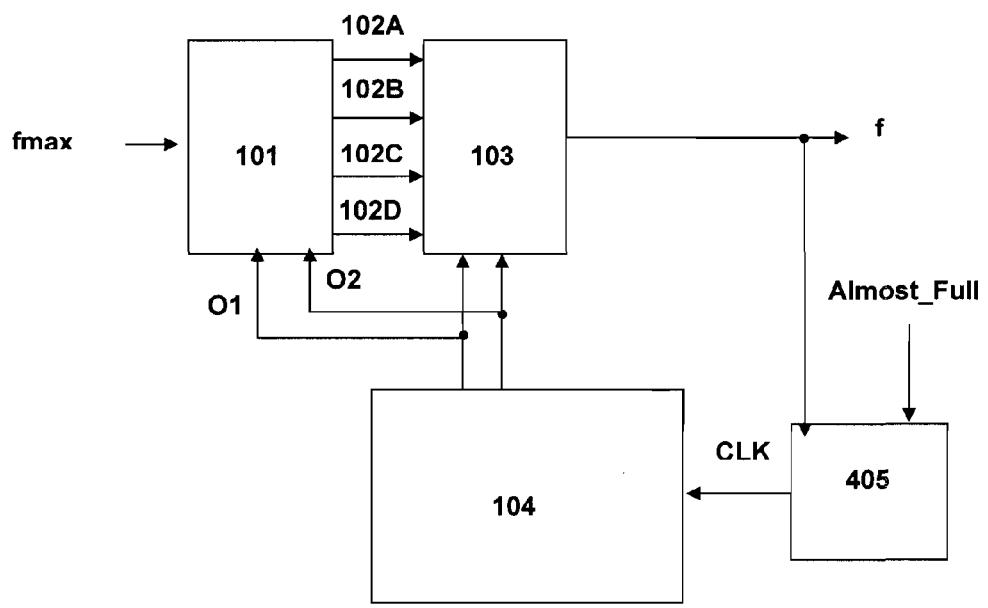
FIG. 4 shows a block diagram of a system according to an embodiment.

Different bits of "almost_full" are asserted by comparing the status of WR_PTR & RD_PTR as is done to assert "Full" and "Empty" signals. The above definition clearly states that only one single bit of "Almost_Full" can be asserted at a time. So in the above example, whenever the memory occupancy level increases from 25% to 50%, the value of the signal almost_full[2:0] changes from "001" to "010". This type of implementation is analogous with the Hot Code notation in which only one bit can be asserted at a time. Depending on the design implementation for multiple clock domains, it may be converted to Gray Code notation, which is the preferred notation for multiple clock domains. The value of this signal is updated in the "wr_clk" domain i.e. the clock of the block which is writing to this asynchronous FIFO, whereas it is captured and used in the "rd_clk" domain to change the frequency of the processing unit which has to read and process the data stored in this FIFO buffer. The "almost_full" signal from asynchronous FIFO, 203A, is used to generate clock signal for processing unit 202A as shown in FIG. 4. Similarly, the "almost_full" signal from asynchronous FIFO, 203B, is used to generate a clock signal for processing unit 202B. Hence every processing unit has its clock generation circuit, as shown in FIG. 4, to generate its clock using "almost_full" signal from its input asynchronous FIFO.

The frequency of the processing unit in embodiments is changed on the basis of the change in workload. The workload is estimated on the basis of the amount of data in the memory waiting to be processed by the processing unit. This is predicted by checking the status of "almost_full" signal. Whenever the value of the signal "almost_full" changes, the algorithm changes the frequency of the processing unit. This means that the performance of the algorithm is highly dependent on the definition and the structure of the signal "almost_full" since it represents different memory occupancy levels. Whenever any change is detected in "almost_full", it triggers the algorithm to change the frequency of the processing unit. For the structure and definition of the "almost_full" signal described above, the frequency of the processing unit changes only when the memory occupancy level reaches 25%, 50% or 75%. The frequency would not get changed for any other changes in the memory occupancy level because the algorithm is dependent on the structure of "almost_full" signal and according to the above defined definition, the value of "almost_full" signal changes only when the memory occupancy reaches 25%, 50% or 75%. The value of the "almost_full" signal will remain the same for other changes in the memory occupancy. The total number of frequencies at which the processing block can run also depends on the implementation of "almost_full". If the width of the signal "almost_full" is N, then the total number of frequencies available to the processing block is N+1.

Again considering the above example in which the signal width is 3, the total number of available frequencies is 4. Now, referring to FIG. 4 which shows a block diagram of a system according to an embodiment. A signal "fmax" is the master clock frequency used to generate other scaled clock frequencies using a series of "divide-by-2" frequency dividers. The frequency dividers may be implemented using T flip-flop. The signals 102A, 102B, 102C and 102D are the four frequencies synthesized by the Frequency Divider Block (101). The frequency 102A represents the master clock frequency, fmax, and other three frequencies 102B, 102C and 102D are the frequencies that can be synthesized using the "divide-by-2" strategy based Frequency Divider Block (101) such that 102A>102B>102C>102D. The actual scaling factor for generating these frequencies depends on the implementation. For the above example, let us choose scaling factor of 2, 4 and 8 for the frequencies 102B, 102C and 102D respectively such that 102A=2*102B=4*102C=8*102D. A frequency selector (103) selects one of these frequencies based on some control signals generated by a control block (104). The selected frequency is shown as f in FIG. 4.

In one embodiment, the clock frequency for the next task is changed to any of these four frequencies whenever any change in "almost_full" is detected. The processing unit starts working at the lowest frequency, which is 102D in this example. If the value of almost_full[2:0] increases, say from 000 to 001, it means that 25% of memory is now filled with data that needs to be processed by the processing unit and processing unit should try to process the data faster, so increase its frequency to the next level frequency, 102C. Again depending on how the "almost_full" is changed next time, the frequency is changed from 102C to 102B or from 102C to 102D depending on whether "almost_full" has decreased or increased respectively. A clock for triggering the control block (104) is generated by a trigger generator (405) as shown in FIG. 4. The trigger generator (405) receives the selected clock of frequency (f) and the signal "almost_full" as its input. Every cycle of the clock signal having frequency (f), the trigger generator (405) compares the current value of "almost_full" signal with the value available in the last clock cycle. In case the value has got changed, it asserts the signal, CLK, which is used as the clock of control block (104).

Figure 5:
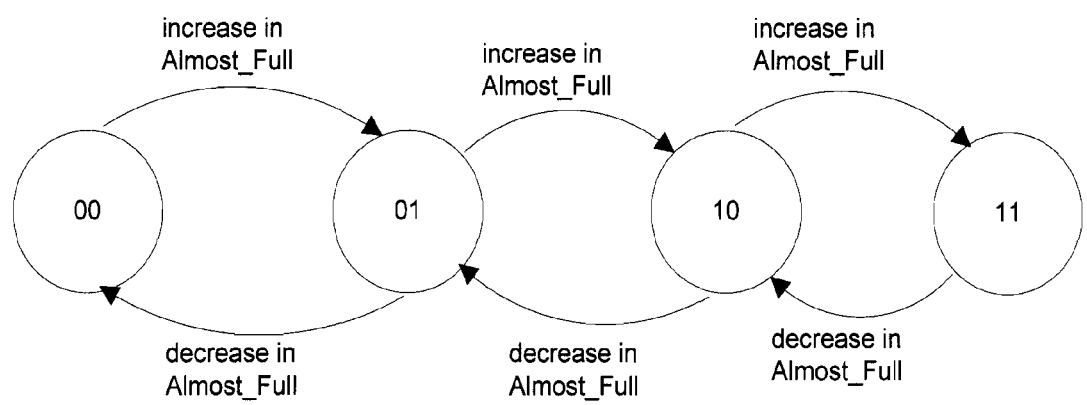
FIG. 5 shows the logic used for the functioning of a Moore machine.

In one embodiment, a Moore machine acts as a Control Block (104). The Moore machine is implemented by means of a synchronous sequential circuit and its clock, CLK, is generated by the trigger generator (405). FIG. 5 shows the state machine used for the implementation of the Moore machine. The Moore machine, on each rising edge of CLK, generates control signals, $O_1$ and $O_2$, which are used by the frequency selector (103) and frequency divider block (101). The state numbers, shown in FIG. 5, represents the output associated with each state. It is shown that the output associated with each state is fed to the frequency selector which determines the next frequency of the processing unit. The starting state of Moore machine is 00. At this starting point, the value of Almost_Full [2:0] is 000 and the frequency is minimum i.e. 102D. Now if from this point, the value of Almost_Full [2:0] gets changed to 001, then the next state would be 01. Depending on the further changes in the value of the "almost_full" signal, the state can change from 01 to 00 or 10 and so on.

Figure 6:
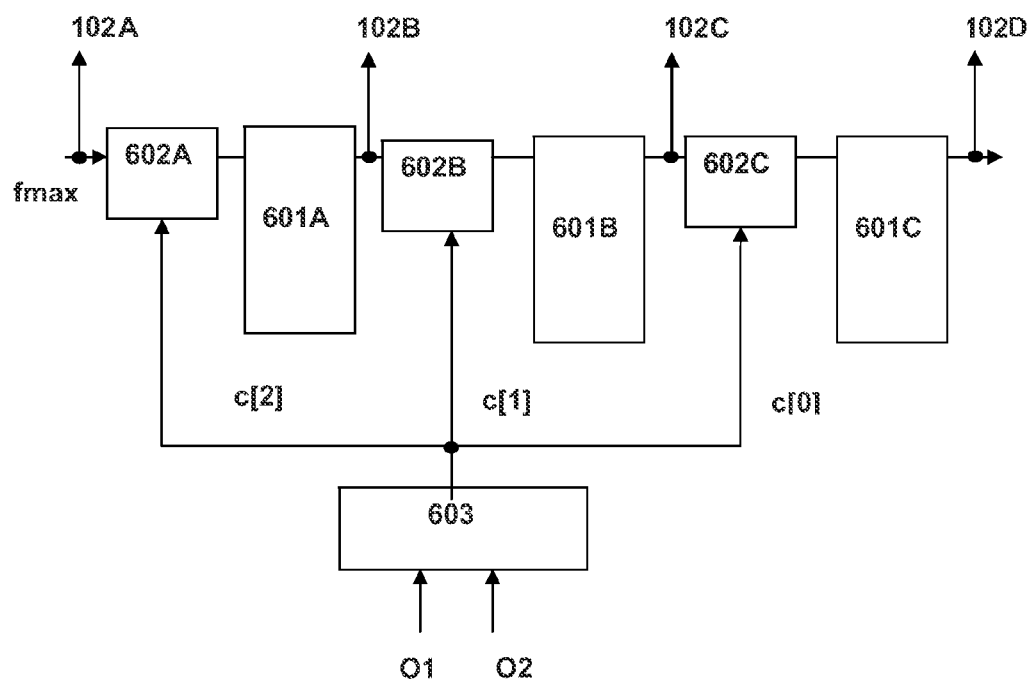
FIG. 6 shows the implementation of a frequency divider according to an embodiment.

The implementation of the frequency divider block (101) is shown in FIG. 6. 601A, 601B, and 601C are divide-by-two frequency dividers. They are implemented by means of T flip-flops. 602A, 602B and 602C are pass logic blocks. These blocks allow or block a signal to pass through them depending on whether the blocks are enabled or disabled respectively. An Encoder (603) takes the outputs, $O_1$ and $O_2$, of Control Block (104) as its inputs and sends signals c[2], c[1] and c[0] respectively to 601A, 601B, and 601C. These signals enable Pass Logic blocks such that only the needed scaled frequency is generated as the output of frequency divider. Assuming that the "almost_full [2:0]" signal changes its value from 000 to 001, the output of Control Block [$O_1,O_2$], would be 01 and the frequency needed would be 102C i.e. only two Pass Logic blocks need to be activated. So encoder (603) generates c [2:0] as 110. As a result, pass logic blocks 602A and 602B are enabled and the required frequency (which is 102C in this case) is generated at the output of 601B. Similarly, if the output of the Control Block is 10, frequency needed would be 102B, so encoder (603) generates c[2:0] as 100. Also, for output values of 11 and 00, the value of c[2:0] would be 000 and 111 respectively. So depending on the values of output of Control Block, $O_1$ and $O_2$, the encoder (603) generates c[2:0] so that only the required logic is enabled.

It is believed that the present disclosure and many of its attendant advantages will be understood by the foregoing description of embodiments thereof. It is also believed that it will be apparent that various changes may be made in the form, construction and arrangement of the components thereof without departing from the scope and spirit of the described embodiments or without sacrificing all of its material advantages. The form herein before described being merely an exemplary embodiment thereof, it is the intention of the following claims to encompass and include such changes. Embodiments can be utilized in a variety of different types of electronic devices, such as cellular telephones and personal digital assistants.

From the foregoing it will be appreciated that, although specific embodiments have been described herein for purposes of illustration, various modifications may be made without deviating from the spirit and scope of the present disclosure.

I claim:

1. A system for adaptive frequency scaling in an electronic device, comprising:
    an input interface block for receiving real time data;
    at least one processing unit for processing real time data received by said input interface block;
    at least one memory unit for storing the real time data before said data is processed by the processing unit;
    a frequency divider block operable to discretely generate a number of clock frequencies from a received clock frequency; and
    a control unit for selecting an appropriate frequency of operation for the processing unit from said multiple clock frequencies, wherein said selection is based on the level of utilization of said memory unit and wherein the number of clock frequencies the frequency divider block generates is based on the selection.

2. A system for adaptive frequency scaling in an electronic device as claimed in claim 1, wherein said memory unit is a FIFO buffer.

3. A system for adaptive frequency scaling in an electronic device as claimed in claim 2, wherein a set of signals associated with each said FIFO comprising:
    a clock for writing into said FIFO buffer;
    a clock for reading from said FIFO buffer;
    a signal for checking if said FIFO is full or empty;
    a pointer for reading from said FIFO buffer;
    a pointer for writing into said FIFO buffer; and
    a status signal for signaling the percentage occupancy level of said FIFO buffer.

4. A system for adaptive frequency scaling in an electronic device as claimed in claim 3, wherein definition and structure of said status signal depends on length of packets received by said input interface and depth of buffer used to implement said FIFO buffer.

5. A system for adaptive frequency scaling in an electronic device as claimed in claim 3, wherein only one single bit of said status signal is asserted at a time.

6. A system for adaptive frequency scaling in an electronic device as claimed in claim 3, wherein width of said pointers depends on depth of RAM used to implement said FIFO.

7. A system for adaptive frequency scaling in an electronic device as claimed in claim 2, wherein each said FIFO is asynchronous.

8. The system as claimed in claim 1, wherein said frequency divider block further comprises:
    at least one pass logic block coupled before each said frequency divider; and
    an encoder for sending signals to enable said pass logic blocks.

9. A system for adaptive frequency scaling in an electronic device as claimed in claim 8, wherein said frequency divider is implemented by a T Flip-flop.

10. A system for adaptive frequency scaling in an electronic device as claimed in claim 8, wherein said frequency divider block is a divide-by-two frequency divider.

11. A system for adaptive frequency scaling in an electronic device as claimed in claim 1, wherein said control block is a Moore machine implemented by synchronous sequential circuit.

12. A system for adaptive frequency scaling in an electronic device as claimed in claim 11, wherein the number of states in the Moore machine of said control block is equal to the number of frequencies available at the input of frequency selector.

13. A system for adaptive frequency scaling in an electronic device as claimed in claim 1, wherein the number of frequencies available at the input of frequency selector is one greater than a width of said status signal.

14. The system of claim 1 wherein the frequency divider block includes at least two frequency dividers coupled in series.

15. The system of claim 14 wherein the frequency divider block is adapted to receive a master clock signal having a maximum frequency and is further operable in response to the selection of the control unit to isolate and couple selected ones of the frequency dividers to receive either the master clock signal or a clock signal from an adjacent frequency divider and thereby control the number of clock frequencies the frequency divider block generates.

16. They system of claim 15,
    wherein the frequency divider block further includes at least one pass logic block coupled in series with the frequency dividers,
    wherein a first one of the pass logic blocks is adapted to receive the master clock signal and is operable to either isolate or couple the master clock signal to a first one of the frequency dividers, and
    wherein each other pass logic block is coupled between adjacent frequency dividers to isolate or couple the adjacent frequency dividers to one another.

17. The system of claim 16 where each of the frequency dividers comprises a divide-by-two frequency divider.

18. The system of claim 17 where each of the divide-by-two frequency dividers comprises a T-type flip-flop.

19. The system of claim 18 wherein the frequency divider block includes three T-type flip-flops.

20. A system for adaptive frequency scaling in an electronic device comprising:
    an input interface block for receiving real time data;
    at least one processing unit for processing real time data received by said input interface block;
    at least one memory unit for storing the real time data before said data is processed by the processing unit;
    a frequency divider block operable to discretely generate multiple clock frequencies from a received clock frequency;
    a control unit for selecting an appropriate frequency of operation for the processing unit from said multiple clock frequencies wherein said selection is based on the level of utilization of said memory unit; and wherein said frequency divider block comprises:
  at least two frequency dividers connected in series;
  at least one pass logic block coupled before each said frequency divider; and
  an encoder for sending a signal to enable said pass logic block to allow a frequency signal to pass through.

21. A method for adaptive frequency scaling in an electronic device, comprising:
  generating a plurality of clock signals, each clock signal having a different frequency;
  initially operating a processing unit of the electronic device responsive to a first one of the clock signals;
  keeping track of data present in a memory for processing by the processing unit;
  signaling a change in an occupancy level of the memory; and
  changing the frequency of operation of the processing unit in response to a change in the occupancy level of memory; and
  varying the number of generated clock signals in response to a change in the occupancy level of the memory.

22. A method for adaptive frequency scaling in an electronic device as claimed in claim 21, wherein value of said signal increases or decreases when memory occupancy increases or decreases respectively.

23. A method for adaptive frequency scaling in an electronic device as claimed in claim 21, wherein frequency of operation increases or decreases when value of said signal increases or decreases respectively.

24. A dynamic frequency clocking system, comprising:
  a memory unit adapted to receive input data, the memory unit operable to store the input data and to generate an almost full signal indicating the amount of input data stored in the memory unit;
  a processing unit coupled to the memory unit to receive input data, the processing unit operable to process the received input data responsive to a clock signal;
  a clock generation circuit coupled to the processing unit, the clock generation circuit operable to discretely generate a plurality of clock signals from a plurality of frequency dividers, each clock signal having a different frequency and the clock generation circuit operable responsive to a selection signal to apply a selected one of the clock signals to the processing unit; and
  a control block coupled to the clock generation circuit and to the memory unit, the control block operable responsive to the almost full signal to apply the selection signal to the clock generation circuit to select the one of the plurality of clock signals that is applied to the processing unit, wherein the almost full signal is a digital signal including N bits and wherein only one of the N bits of the almost full signal is set at a time.

25. The dynamic frequency clocking system of claim 24 further comprising an input interface block coupled to the memory unit, the input interface block adapted to receive the input data and operable to provide the received input data to the memory unit.

26. The dynamic frequency clocking system of claim 24 wherein the memory unit comprises a FIFO buffer.

27. The dynamic frequency clocking system of claim 24 wherein the clock generation circuit comprises a frequency divider block coupled to a frequency selector block.

28. The dynamic frequency clocking system of claim 24 wherein the almost full signal indicates the percentage of the total capacity of the memory unit currently containing input data.

29. The dynamic frequency clocking system of claim 28 wherein the control block is operable to select one of the clock signals having a lower frequency when the almost_full signal indicates less data is stored in the memory unit than the last time the control block checked a value of the almost_full signal and is operable to select one of the clock signals having a higher frequency when the almost_full signal indicates more data is stored in the memory unit than the last time the control block checked the value of the almost_full signal.

30. An electronic system, comprising:
  electronic circuitry; and
  a dynamic frequency clocking system coupled the electronic circuitry, the dynamic frequency clocking system including,
  a memory unit adapted to receive input data, the memory unit operable to store the input data and to generate an almost_full signal indicating the amount of input data stored in the memory unit;
  a processing unit coupled to the memory unit to receive input data, the processing unit operable to process the received input data responsive to a clock signal;
  a clock generation circuit coupled to the processing unit, the clock generation circuit operable to generate a plurality of clock signals, each clock signal having a different frequency and the clock generation circuit operable responsive to a selection signal to apply a selected one of the clock signals to the processing unit, and each clock signal being associated with a corresponding occupancy range of the memory unit and the clock generation circuit further operable to vary the number of clock signals that are generated responsive to the selection signal; and
  a control block coupled to the clock generation circuit and to the memory unit, the control block operable responsive to the almost_full signal to apply the selection signal to the clock generation circuit to select the one of the plurality of clock signals that is applied to the processing unit.

31. The electronic system of claim 30 wherein the electronic circuitry comprises cellular telephone or personal digital assistant circuitry.

32. A method of adaptively controlling a frequency of a clocking signal applied to clock a processing unit in an electronic device, the method comprising:
  detecting an amount of data stored and awaiting processing by the processing unit; and
  controlling the frequency of the clocking signal applied to the processing unit as a function of detected amount of stored data, the controlled frequency being one of a plurality of discrete frequencies; and
  changing the number of discrete frequencies responsive to a change in the amount of data stored and awaiting processing.

33. The method of claim 32 further comprising:
  detecting a change in the amount of data stored;
  when the detected change indicates less data is stored and awaiting processing, controlling the frequency of the clocking signal to lower the frequency of this signal; and
  when the detected change indicates more data is stored and awaiting processing, controlling the frequency of the clocking signal to increase the frequency of this signal.

34. The method of claim 32 wherein detecting an amount of data stored and awaiting processing by the processing unit comprises detecting a percentage of a total storage capacity for data that currently contains data awaiting processing.

* * * * *

UNITED STATES PATENT AND TRADEMARK OFFICE
CERTIFICATE OF CORRECTION

| | | |
|---|---|---|
| PATENT NO. | : 8,250,394 B2 | Page 1 of 1 |
| APPLICATION NO. | : 11/732495 | |
| DATED | : August 21, 2012 | |
| INVENTOR(S) | : Parag Vijay Agarwal | |

It is certified that error appears in the above-identified patent and that said Letters Patent is hereby corrected as shown below:

In the Claims

In claim 9 at column 8, line 8, "claim 8" should read --claim 7--.

In claim 11 at column 8, line 14, "claim 1" should read --claim 2--.

In claim 13 at column 8, line 23, "claim 1" should read --claim 12--.

Signed and Sealed this
Sixth Day of May, 2014

Michelle K. Lee
*Deputy Director of the United States Patent and Trademark Office*